Figure 1:
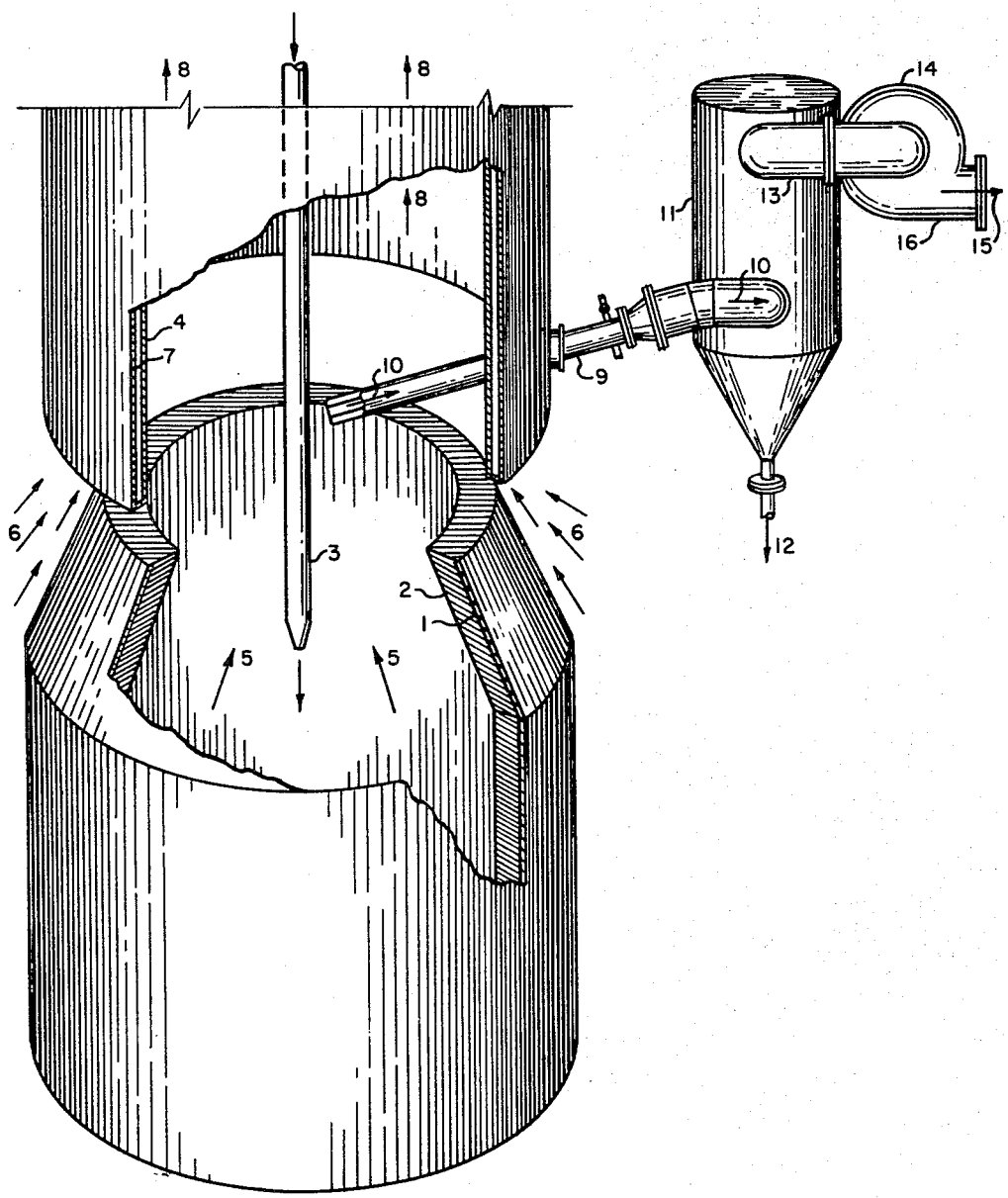

June 1, 1965 D. E. PIKE 3,186,831
METHOD OF RECOVERING OFF-GAS AND GAS PROBE APPARATUS THEREFOR
Filed Oct. 25, 1961 2 Sheets-Sheet 1

FIGURE I.

DANIEL E. PIKE
*INVENTOR.*

BY
*AGENT*

3,186,831
METHOD OF RECOVERING OFF-GAS AND GAS
PROBE APPARATUS THEREFOR
Daniel E. Pike, Emerson, N.J., assignor to Chemical Construction Corporation, New York, N.Y., a corporation of Delaware
Filed Oct. 25, 1961, Ser. No. 147,505
7 Claims. (Cl. 75—60)

This invention relates to the removal and recovery of off-gas from steel furnaces, particularly specialized units such as oxygen converters and electric steel furnaces. A method and apparatus has been developed, which permits the recovery of such off-gas from the hood section of these furnaces as a purified reducing gas, substantially undiluted with air and free of entrained solids.

The conventional procedure in operation of oxygen converters and similar steel furnaces involves a melt purification step, in which oxygen or oxygen-enriched air is injected into the furnace by means of an oxygen lance. The resulting furnace off-gas, consisting predominantly of carbon monoxide together with entrained solid particles such as iron oxide, is removed from the furnace through an upper outlet known as a mouth, and is collected in a gas hood. The hood surrounds the mouth, however, a spacing is generally provided between the hood and the furnace mouth in order to permit entry of air into the hood. This air serves to cool the inner surface of the hood and also aids in ventilation. The oxygen content of the air immediately reacts with the carbon monoxide. A negative pressure is generally maintained in the hood, and a final off-gas stream is recovered which contains carbon monoxide, carbon dioxide, nitrogen and entrained solids.

This final gas stream cannot be discharged into the atmosphere, due to air pollution considerations, and consequently the stream must be scrubbed or otherwise treated for solids removal. Due to the air dilution described supra, a large amount of power is usually required in order to handle the waste gases at a static pressure high enough to obtain satisfactory gas cleaning, when such cleaning is done by means of the method and apparatus described in U.S. Patent 2,604,185 or similar procedures. In addition, the cleaned gas stream is usually discarded since its heating value is negligible because of air dilution. As mentioned supra, it is generally considered necessary to induce a certain amount of air into the gas hood for ventilation and combustion purposes, since if no air is induced some of the off-gas escapes into the atmosphere surrounding the furnace. Usually excess air is induced, and all the carbon monoxide is burned in the hood. The hood cannot be conveniently attached around the furnace mouth by a gas-tight seal because of basic process considerations, since the furnace must be tilted after the oxygen purification step. Typical details of hood arrangements and overall apparatus layouts are shown in U.S. Patents 3,002,739; 2,908,737; 2,862,701; 2,847,206 and 2,803,450.

In the present invention, a probe is inserted into the central zone of the hood adjacent to the mouth of the furnace. This probe consists of a duct for removal of off-gas from the furnace hood. A portion of the furnace off-gas is thus separately withdrawn before the air dilution, and is induced into the duct and highly accelerated. A scrubbing liquid such as water is projected transverse to the high velocity gas stream at the duct inlet, and quench scrubbing action of the type described in U.S. Patent 2,604,185 takes place. The resulting gas stream is then usually passed through a device for separation of entrained liquid, such as the apparatus described in U.S. Patent 2,998,100. The gas stream finally passes through induction means such as a blower or fan. The resulting product gas stream is thus clean and undiluted with air, and is suitable for usage as fuel gas.

This procedure has several notable advantages. The off-gas portion which is withdrawn through the probe is collected unburned and undiluted, and thus is suitable for usage as a fuel gas. Due to the probe withdrawal of off-gas, the net gas volume passing from the duct to the main gas cleaning plant is reduced. Furthermore, the average dust loading in this net gas volume is reduced, and the main gas plant can operate at a lower static pressure since lower efficiency is required for dust removal to an equivalent low final dust content. This reduction in average dust loading is achieved because the off-gas portion which is withdrawn through the probe and thus removed from the main off-gas stream, is collected at the most concentrated point of the system in terms of dust loading. Finally, the method and apparatus of the present invention is applicable to existing installations as well as to new facilities, and is feasible for adaptation and utilization in various other specialized steel-making procedures such as electric furnaces.

It is an object of the present invention to recover off-gas from steel furnaces in an improved manner.

Another object is to recover a portion of the total steel furnace off-gas in reduced state, undiluted with air and usable as fuel.

An additional object is to separately remove part of the furnace off-gas from the outlet hood by means of apparatus which is inserted into the main hot gas stream and simultaneously quench-scrubs the removed portion.

A further object is to reduce the net gas volume and dust loading of the main off-gas stream derived from the hood which is disposed about the oxygen lance opening in oxygen converters.

Figure 2:
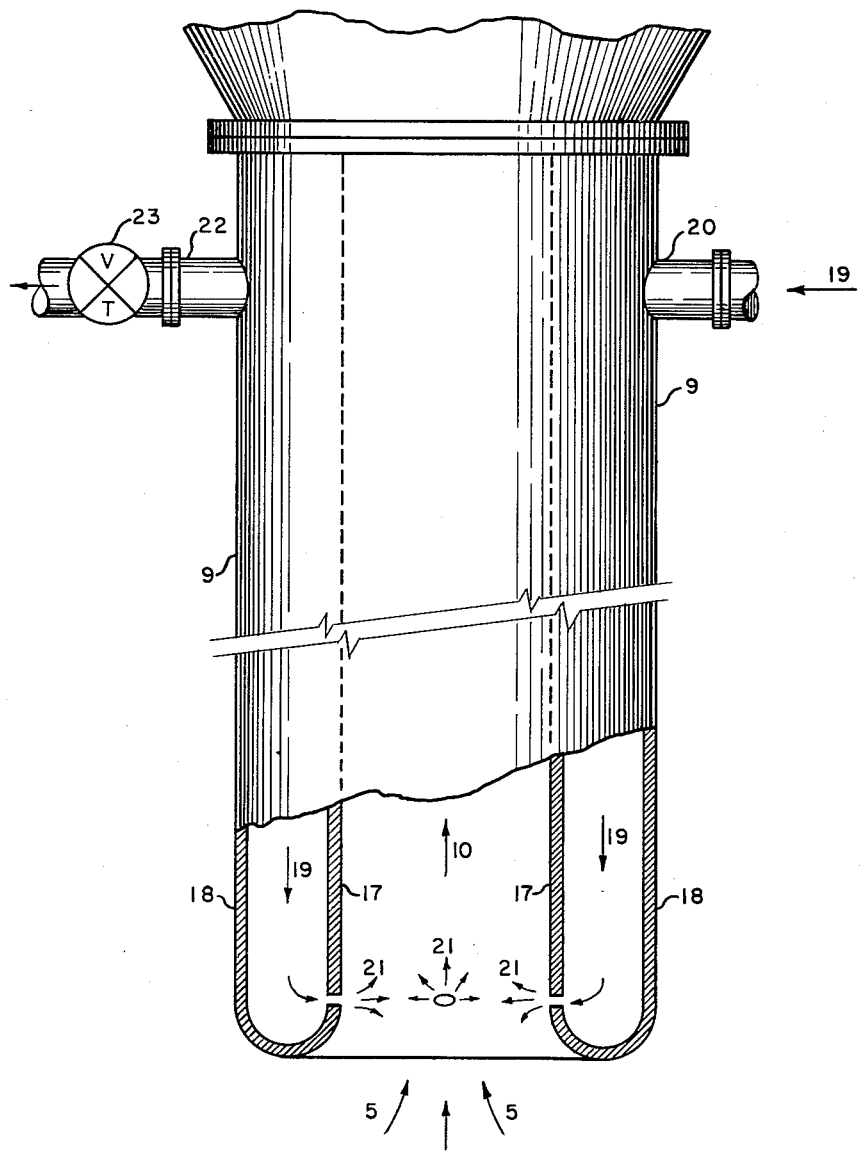

These and other objects and advantages of the present invention will become evident from the description which follows. Referring to the figures, in which a typical embodiment of the present invention is illustrated, FIGURE 1 shows the overall apparatus arrangement while FIGURE 2 is a detail of a preferred type of probe. In FIGURE 1, the upper portion of steel furnace 1 is shown, together with refractory lining 2. Furnace 1 has an upper mouth opening, which in the case of oxygen converters serves as gas outlet as well as a melt charging inlet and pouring spout when the furnace is tilted. When furnace 1 is operated as an oxygen converter, oxygen lance 3 is also inserted through the mouth. Lance 3 serves to discharge oxygen or oxygen-enriched air into the melt which is contained in furnace 1.

A hood 4 is disposed about the mouth of furnace 1, and serves to collect the furnace off-gas stream 5. Hood 4 is spaced away from the wall furnace 1, and thus ventilation air stream 6 is drawn into the hood. Air stream 6 serves to sweep off-gas up into the hood 4 and prevents leakage of this off-gas into the surrounding atmosphere. This is an important function, since off-gas stream 5 is generated and withdrawn at a highly elevated temperature, and also since stream 5 consists mostly of carbon monoxide which is highly poisonous and cannot be allowed to escape into the surrounding air. In addition, stream 5 also contains a high dust loading, which consists primarily of iron oxide.

Air stream 6 has another important function. As indicated on FIGURE 1, stream 6 sweeps up along the inner surface of hood 4, and thus serves to cool the lower part of the wall of hood 4. Hood 4 is also extrenally cooled, by means of water jacket 7.

As air stream 6 rises within hood 4, contact between the air and off-gas stream 5 takes place. This results in combustion in the upper part of hood 4, whereby the oxygen content of stream 6 is consumed. A final gas stream 8 is withdrawn from hood 4, consisting of carbon monoxide, carbon dioxide and nitrogen, together with entrained solid dust particles. Stream 8 is subsequently treated by scrubbing or filter means, not shown, for removal of solids. The cleaned gas stream is then discharged to the atmosphere, since stream 8 has a very low heating value due to dilution with air stream 6.

Returning now to the lower part of hood 4, gas probe unit 9 is inserted through the wall of hood 4, with the inlet of probe 9 located in the central zone of hood 4 where the gas composition consists only of off-gas stream 5. Other suitable modes of positioning probe 9, besides entry through the wall of hood 4, will occur to those skilled in the art. Thus, for example, probe 9 could be inserted through the spacing between hood 4 and furnace 1, however, in this case the flow of air stream 6 and the tilting action of furnace 1 might be somewhat restricted. A portion of off-gas stream 5 is drawn into probe 9, and as will appear infra this portion is immediately accelerated to a high velocity, and quenched and scrubbed by transverse injection of scrubbing liquid. The dust content of the stream is thus removed into the liquid phase, and the resulting gas stream 10 together with entrained liquid is drawn up through probe 9. This mixed stream now preferably passes through an entrainment separator such as cyclone 11, for removal of entrained liquid droplets and mist. The collected liquid, together with solids washed out of the gas stream, is removed from cyclone 11 via 12. Unit 11 may alternatively consist of the entrainment separator apparatus described in U.S. Patent 2,998,100, or other suitable devices.

The gas stream is drawn out of separator 11 and through duct 13 by centrifugal blower 14. Other suitable types of blowers or gas impellers may be employed for this purpose. The resulting gas stream 15 is now discharged from the system via duct 16. Stream 15 is a clean gas, consisting mostly of carbon monoxide, and is suitable for usage as a heating fuel gas or for other purposes.

Referring now to FIGURE 2, a preferred type of gas probe apparatus is shown in detail. In FIGURE 2, the overall probe 9 is provided with inner and outer ducts 17 and 18. The off-gas stream 5 is drawn into inner duct 17 and accelerated to a high velocity, while the scrubbing liquid stream 19 is admitted via 20 into the annular space between ducts 17 and 18. Thus, stream 19 proceeds through this annular space and is discharged via openings 21 into the gas stream as liquid jets. The liquid jets are injected into the high velocity gas stream in a direction substantially transverse to gas flow. A quench scrubbing action thus takes place, of a nature as described in U.S. Patent 2,604,185. The resulting cooled and cleaned gas stream 10, together with entrained liquid particles, then proceeds through inner duct 17 for treatment as described supra.

It will be evident that the liquid stream 19 performs an additional function, prior to being injected into the gas stream through openings 21. While the liquid stream 19 is flowing through the annular space between ducts 17 and 18, this liquid serves as a cooling and insulating agent, thus preventing the overheating of duct 18 as well as the reheating of cooled gas stream 10. The liquid stream 19 will preferably consists of water, and in this case steam outlet duct 22 and vent 23 should be provided in order to discharge any steam which may form in the annular space between the ducts.

Various alternatives may be adopted with respect to the probe besides those shown in FIGURE 2. Thus a liquid consisting of a hydrocarbon oil may be employed as a quench instead of water. This modification would have an advantage in that the final product gas stream 10 would be produced with negligible water vapor content. In some cases, if a substantial amount of fuel gas is to be produced, liquid stream 19 could consist of a light hydrocarbon fraction in which case partial cracking and gasification of the hydrocarbon oil would be achieved.

Some type of probe cooling, such as the cooling accomplished by liquid flow between ducts 17 and 18 or other jacketed cooling, is preferred in order to lengthen equipment life by the prevention of overheating. However, the probe may, of course, be operated with internal thermal insulation or cooling means of other types, or even without any cooling. In the latter case, a single duct would be employed. A plurality of jets would be mounted at the duct entry, with the quench-scrubbing liquid being supplied to the jets by a suitable supply pipe within the duct. In any case, it is necessary that the off-gas stream 5 be drawn into the duct from the central zone prior to dilution with air, in order to accomplish the purposes of the present invention. In addition, the duct must be of relatively small cross-sectional area, in order that the gas will be immediately accelerated to a high velocity in the probe prior to quench scrubbing.

*Example*

The application of the present invention to an industrial type of facility will now be described. A typical oxygen converter furnace employs 10,800 s.c.f.m. of lance oxygen during the blow period. Off-gas is generated at a temperature of about 2900° F. to 3000° F. In this case, 4 probes are employed to remove off-gas from the hood. Each probe is a 10" circular duct, and a high gas velocity of 400 f.p.s. is maintained in the duct. Thus a relatively high volume of 13,000 c.f.m. saturated gas (equivalent to 5400 c.f.m. dry carbon monoxide) is handled, which is equivalent to 2,700 s.c.f.m. of lance oxygen. Under these conditions, about 80% of the total off-gas is removed by the 4 probes, with a high dust loading of 40–50 gr./s.c.f.d. It will be evident that the size of the main gas cleaning plant required for processing the hood gas stream is thus drastically reduced.

It should be noted that the reduction in residual hood gas volume achieved in the example supra, may result in a further simplification of the total facility. Thus, in some cases the net hood gas stream may be of such a small volume that it can merely be discharged to the atmosphere through a hood stack, without scrubbing for solids removal. It will also be appreciated that the furnace hood may even be operated without a conventional stack. That is, the hood may be positioned over the furnace opening as an enclosed unit without a conventional upper gas outlet. In this alternative, all gas removal from the hood would be by means of probes. This arrangement would eliminate hood gas scrubbing completely, in addition to providing the various probe advantages discussed supra. However, the product off-gas stream derived from the probes in this case would be somewhat diluted with air since all the air entering the hood would have to be withdrawn through the probes. The volume of air drawn into the hood would of course be minimized by suitable special design and physical layout of the hood and furnace opening. In addition, a plurality of probes could be employed in this case, with some of the probes disposed centrally in the hood so as to selectively recover streams of off-gas free of air. Other probes would be disposed near the outer periphery of the hood, and would serve to recover separate off-gas streams containing the substantial proportion of air drawn into the hood, together with the balance of the furnace off-gas.

What I claim is:

1. Method of recovering off-gas undiluted with air and substantially free of entrained solids from the air-ventilated hood of a steel furnace or the like which comprises selectively inducting a portion of said off-gas from the central region of said hood through separate duct removal means, accelerating said gas portion to high velocity at the point of induction, thereafter immediately quench-cooling and scrubbing said gas portion at the point of induction by injection of liquid into the accelerated gas stream substantially transverse to gas flow, whereby entrained solids are removed from the gas stream into the injected liquid and the gas stream is purified within said duct removal means, and separating entrained liquid droplets from the resulting scrubbed and cooled final gas stream, whereby the final gas stream recovered from the furnace is undiluted and purified.

2. Method of claim 1, in which said liquid is water.

3. Gas probe apparatus for recovering steel furnace off-gas substantially undiluted with air and substantially free of entrained solids which comprises a steel processing furnace, a gas hood disposed about an opening in said furnace and displaced from the wall of said furnace whereby cooling air is admitted into said hood together with furnace off-gas, an off-gas recovery duct, said duct extending external to said hood from a central region within said hood containing off-gas undiluted with air, a gas quench at the inlet of said duct comprising means for injecting washing liquid into said duct substantially transverse to gas flow, whereby off-gas passing into said duct is quenched and scrubbed, means for separating entrained liquid droplets from the resulting scrubbed and cooled gas stream, and gas exhaustion means attached to the outlet of said duct external to said hood, said gas exhaustion means serving to induce high velocity flow of un diluted off-gas into said duct.

4. Apparatus of claim 3, in which said duct comprises an inner gas passage conduit circumscribed by an outer insulating conduit, together with means for circulating cooling medium in the annular space between said conduits.

5. Apparatus of claim 4, in which said cooling medium consists of said washing liquid, and the inlet end of said gas passage conduit is provided with a plurality of openings, whereby said washing liquid passes through the annular space between said conduits and thereafter is projected through said openings into said gas stream.

6. Gas probe apparatus for recovering a purified off-gas comprising carbon monoxide free of entrained solids and undiluted with air from an oxygen-type steel furnace, which comprises a furnace for steel conversion by oxygen treatment, a gas hood disposed about an opening in said furnace and displaced from the wall of said furnace whereby cooling air is admitted into said hood together with furnace off-gas, an oxygen lance for admission of oxygen, said lance extending into said furnace through said opening, an off-gas recovery duct extending external to said hood from a central region within said hood containing off-gas undiluted with air, said duct comprising an inner gas passage conduit circumscribed by an outer insulating conduit, with the inlet end of said gas passage conduit being provided with a plurality of openings, means to pass water through the annular space between said conduits whereby said water passes to the openings in said inner conduit and thereafter is projected through said openings into said gas stream substantially transverse to gas flow and quench-scrubs said gas stream, an entrainment separator for removal of entrained liquid droplets from gas, said separator being attached to the outlet of said duct external to said hood, and gas exhaustion means attached to the outlet of said entrainment separator and serving to induce high velocity flow of undiluted off-gas into said duct.

7. Apparatus of claim 3, in which said means for injecting washing liquid into said duct substantially transverse to gas flow at the inlet of said duct comprises a supply pipe for quench liquid within the duct, a plurality of jets at the duct entry, said supply pipe extending to and connected with said jets, said jets being disposed to discharge washing liquid essentially transverse to gas flow, and means to pass washing liquid through said supply pipe for discharge through said jets.

References Cited by the Examiner

UNITED STATES PATENTS

| | | | |
|---|---|---|---|
| 917,561 | 4/09 | Double | 261—118 XR |
| 2,092,305 | 9/37 | Estes et al. | 261—118 XR |
| 2,831,467 | 4/58 | Guczky | 266—36 |
| 2,847,206 | 8/58 | McFeaters | 266—35 |
| 2,855,292 | 10/58 | Vogt | 75—60 |
| 3,002,739 | 10/61 | Lawler | 266—35 |

FOREIGN PATENTS

| | | |
|---|---|---|
| 274,514 | 5/30 | Italy. |
| 198,255 | 10/38 | Switzerland. |
| 872,088 | 7/61 | Great Britain. |

OTHER REFERENCES

German printed application 1,063,191, Aug. 13, 1959, 266-35.

MORRIS O. WOLK, *Primary Examiner.*

RAY K. WINDHAM, JAMES H. TAYMAN, JR.,
*Examiners.*